United States Patent [19]

Herrington

[11] 4,022,558
[45] May 10, 1977

[54] APPARATUS FOR THE EXTRUSION OF TUBULAR THERMO-PLASTIC FILM

[75] Inventor: F. John Herrington, Holcomb, N.Y.

[73] Assignee: Mobil Oil Corporation, New York, N.Y.

[22] Filed: Dec. 15, 1975

[21] Appl. No.: 641,063

Related U.S. Application Data

[62] Division of Ser. No. 467,187, May 6, 1974, Pat. No. 3,976,732.

[52] U.S. Cl. .............................. 425/72 R; 264/89; 264/95; 264/209; 425/326 R
[51] Int. Cl.² ........................................ B29D 23/04
[58] Field of Search ........... 425/72, 326 R; 264/89, 264/95, 209, 210 R

[56] References Cited
UNITED STATES PATENTS

| | | | |
|---|---|---|---|
| 3,280,429 | 10/1966 | Haley | 425/72 X |
| 3,427,375 | 2/1969 | Turner | 264/95 |
| 3,507,006 | 4/1970 | Princen | 425/72 |
| 3,551,540 | 12/1970 | Pellicciari et al. | 264/95 |
| 3,568,252 | 3/1971 | Masuda et al. | 264/95 |
| 3,668,288 | 6/1972 | Takahashi | 264/95 X |
| 3,775,523 | 11/1973 | Haley | 264/95 |
| 3,819,790 | 6/1974 | North et al. | 425/72 |

*Primary Examiner*—Robert L. Spicer, Jr.
*Attorney, Agent, or Firm*—Charles A. Huggett; James D. Tierney

[57] ABSTRACT

The present invention relates to a method and apparatus for the extrusion of tubular thermoplastic film which comprises extruding a melt of thermoplastic through an annular orifice to form a bubble or tube and while the tube is still in a semimolten condition, passing the tube through an extrusion cooling and shaping means having a plurality of multi-perforated air rings shaped in congruance to the desired shape of the inflating tube. This method allows increased production speeds and minimized gauge variation while maintaining bubble stability.

2 Claims, 5 Drawing Figures

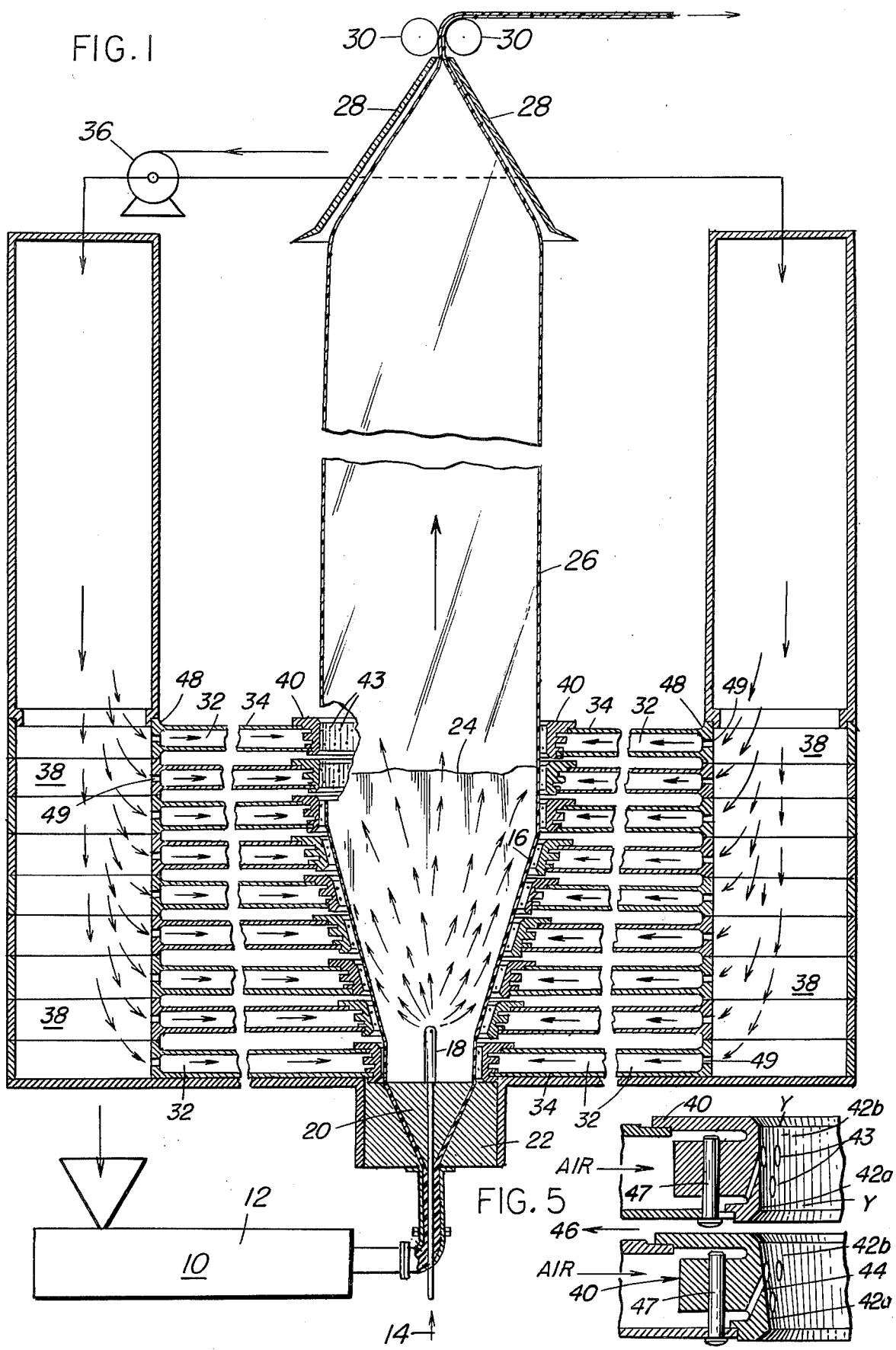

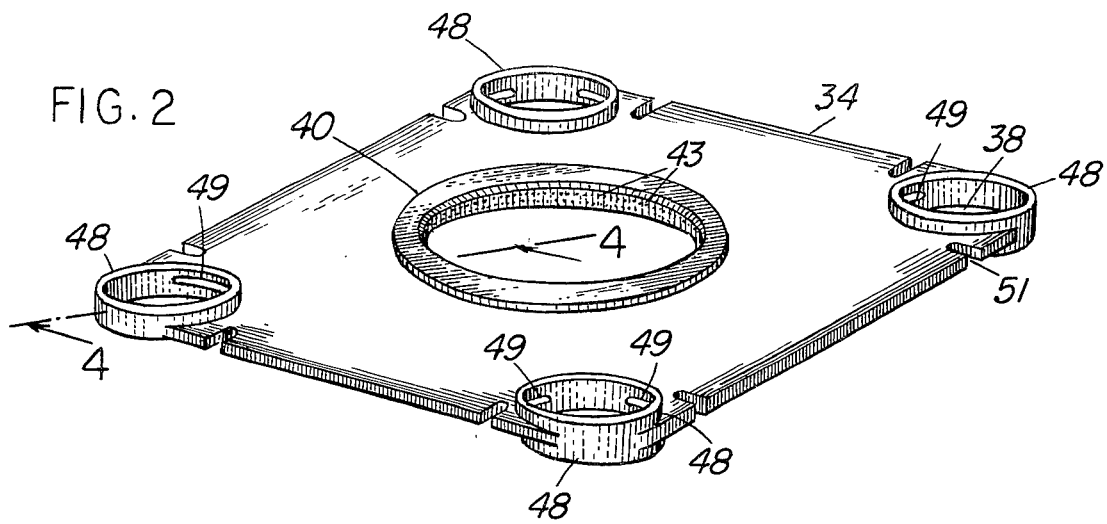
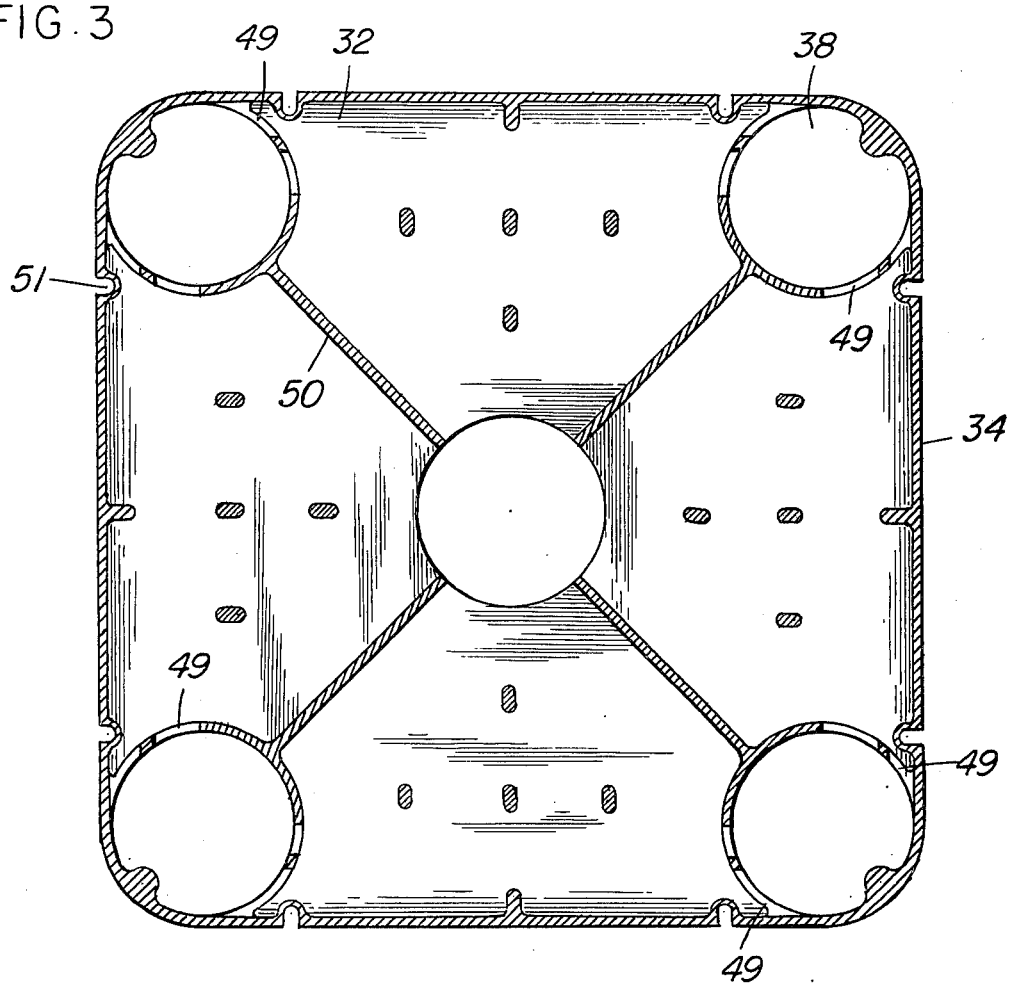
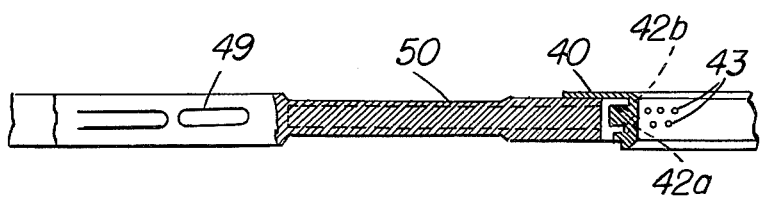

APPARATUS FOR THE EXTRUSION OF TUBULAR THERMO-PLASTIC FILM

Related U.S. Application

This is a Division of applic;ation Ser. No. 467,187, filed May 6, 1974, now U.S. Pat. No. 3,976,732.

BACKGROUND OF THE INVENTION

1. Field of the Invention

The present invention relates to an apparatus and method for producing blown tubular films from thermoplastic materials. More particularly, this invention relates to improved tube forming and cooling procedures wherein a blown tube is formed by differential air pressure produced by the action of high velocity cooling air conducted toward and along the external surfaces of the advancing tube as it is being formed.

2. Description of the Prior Art

Generally, the prior art technique for forming tubular thermoplastic films comprises continuously extruding a melt of a thermoplastic material through an anular orifice, applying internal fluid pressure to the tube thus formed and shape expanding the tube and reducing the wall thickness thereof to appropriate dimensions while cooling and solidifying the extruded thermoplastic. Thereafter, the formed tubing is collapsed by passing it through the nip formed by a pair of counter-rotating pinch rolls. The flattened tubing may be subsequently passed to a wind up station, or on to further processing such as bag-making operations for example.

Although useful tubing has been commercially prepared utilizing this method, under certain circumstances, such a product may have an undesirable gauge non-uniformity, i.e., the thickness of the film is not uniform. Such non-uniform wall thickness results in, for a given average thickness, low gauge points which introduce weak areas in the film. Also, gauge variation results in an uneven, humped roll of film upon winding of the flattened tubing. In addition to the unsightly appearance of such rolls, when the film on such rolls is unwound, it does not lie flat and thus requires special precautions in the printing, conversion and other uses thereof.

One of the major problems in this art is to rapidly cool the extruded bubble of thermoplastic material. Production rate for any given tube (bubble) size is limited by the character of the bubble being extruded. Thus, under a given set of operating conditions, increasing extruder output will cause the thermoplastic to be formed into the tube at a higher rate but since the heat exchange character of the system will not have changed, it will also cause a rise in the height of the frost line (that is the line where the extruded tube turns from molten to solid character). This in turn causes an increase in the instability of the extruded bubble because its unsupported molten length has become too long. Supporting the film bubble in general permits increased cooling air impingement and therefore increased extrusion speeds.

SUMMARY OF THE INVENTION

The present invention comprises a method and apparatus which either eliminates or substantially reduces the prior art difficulties in the production of a thermoplastic tube at a relatively high rate of speed having minimal gauge variations. A method and apparatus is provided for the extrusion of film tubes comprising molten thermoplastic resin through an annular die orifice in the form of a tube, inflating the tube with air and cooling the inflated tube to solidify the molten thermoplastic. The tube is cooled by passing it through an opening formed by a plurality of superposed circular members being supplied with air under pressure for inpingement action on the sides of the advancing tube. Superposed plenum chambers surround each circular member to supply the member with air. Each of said members is defined by a ring element having a pair of diverging aperture rows, the ring elements being detachably secured to the plenum chambers. Air is supplied to the plenum chambers from a plurality of circular inlet conduits located at the edge of the chamber. The inlet conduits are located so that when two or more separate chambers are superposed upon one another, the individual inlet conduits form a common channel which carries air under pressure from an outside source of supply to the respective plenum chambers. The circular air inlet conduits of each plenum chamber are characterized by having a raised circular boss upon their upper and lower peripheries to maintain adjacent plenum chambers in spaced-apart relation. The spacing is to permit the air which has impinged the tubing to escape from the system. More particularly, the present invention relates to an apparatus for forming tubular thermoplastic film which comprises a conventional extruder and annular extruder die means which are employed in combination to extrude a seamless tube of thermoplastic film. A pair of take off, pinch or rollers are spaced downstream from the annular extruder die and they are employed to flatten the extruded tubing as well as draw it away from the annular die means. A fluid such as air is introduced under pressure into the extruded tube to biaxially expand the tube wall while it is still in a semi-molten or heat softened condition whereby the wall thickness of the tube is reduced. A configuration imposition assembly is disposed externally and concentric to said extruded tubing downstream from the die. This assembly comprises a plurality of spaced-apart rows of pairs of diverging aperture elements which face towards the external surface of the tube. A fluid such as air is forced through the descrete apertures toward the tubing and the air resultant flow dynamically creates a suction or vacuum which draws the extruded tubing toward the inside surface of the assembly. The shape imposition assembly is further characterized by having a plurality of vertically spaced-apart individual plenum chambers. The aperture row means referred to hereinabove are detachable from the plenum chambers. The plenum chambers are so formed that a common chamber results upon the superimposition of the individual plenum chamber so that such a common chamber may be employed for feeding air under pressure into each of the individual plenum chambers so superimposed upon one another.

BRIEF DESCRIPTION OF THE DRAWINGS

FIG. 1 is a front elevation, in section, of a typical tubular extrusion apparatus embodying the features of the present invention.

FIG. 2 is a perspective view of one of the air ring elements of the present invention, a plurality of which are shown in section in FIG. 1.

FIG. 3 is an overhead planar view of the internal structure and configuration of the air ring element shown in FIG. 3.

FIG. 4 is a cross sectional view taken on line 4—4 of FIG. 2.

FIG. 5 is an enlarged fragmentary view of a portion of the apparatus shown in FIG. 1.

DESCRIPTION OF SPECIFIC EMBODIMENTS

Inherent in all extrustion dies there is some degree of error in the thickness of molten film exiting around the periphery of the die orifice. This is caused by the difficulty in achieving an absolutely uniform orifice between adjacent die lips.

In conventional processes this thickness error in the molten or semi-molten tube leaving the die normally results in a thickness error, i.e. gauge variation, in the final film. The relationship of film gauge profile to die error is a complex function of cooling rates and viscosities in the molten film as it is being stretched and cooled. It has been found that imposition of a particular shape to the molten film bubble permits control of these various factors so that they inter-react in such a way as to substantially cancel out gauge errors introduced by virtue of the aforedescribed extrusion die non-uniformity.

It has been found that if the bubble is caused to blow-up to its enlarged diameter close to the die, there will be a direct relationship between the die irregularities and the irregularities in the resultant film; that is, where the molten film leaving the die is thickest, the final film will be thickest and vice-versa. Conversely, if the point of blow-up is moved further from the die there will be an inverse relationship, i.e. a thin area leaving the die will result in a thick area in the final film product. By choosing the proper shape, it is possible to effect a cancellation or substitute cancellation of such gauge errors.

In a conventional process, such control is not readily achievable, if at all, whereas practice of th present invention provides the necessary control factors as described hereinafter.

The present method and apparatus includes a conventional, rotating screw, extruder means and annular extrusion die means and conventional internal air, or other fluid, introduction means axially mounted in the annular die. The apparatus also includes conventional pinch roller means spaced apart from the annular die a sufficient distance so that the tube passing therethrough is sufficiently cooled to be substantially solid and non-tacky. Further conventional portions of the apparatus include means to provide sufficient air or other fluid inside the extruded bubble to at least balance the ambient atmospheric pressure and permit the extrudate to form the intended bubble.

One of the important features of the apparatus of this invention is the use of means for imposing a particular configuration on the extruded tube of thermoplastic material from the time it issues from the annular die to the time, downstream thereof, at which it is more in the solid, substantially non-plastic state. This configuration imposition means comprises a housing of generally diverging, e.g. conical, paraboloid or other similar, shape. It is not intended by this characterization of this configuration imposition housing that such be limited to an exact geometric reproduction of such mathematical functions as have been mentioned. Rather these are given as illustrative of the general type of configuration which is useful in this invention. It can be generally stated that this housing diverges at some rate from an initial, upstream position proximate to and concentric about the annular extrusion die to progressively more downstream positions less proximate to but still concentric with the annular extrusion die.

The housing referred to above has channels therethrough each terminating in an aperture on the surface thereof directed toward the extruded tubing. Each row of apertures lies along a plane generally normal to the axis of the annular extrusion die. Each row of channels and of course their corresponding apertures, is associated with one next adjacent row of channels and apertures so that such rows cooperate in pairs. The individual apertures in each of said pair of rows are streamwisedly directed apart at a very wide angle, in fact preferably the widest angle possible considering all other mechanical as will become apparent from this entire specification. The axes of these cooperating aperture and channel pairs are positioned at a very small acute angle with respect to the surface of the thermoplastic tube extruded from the referred to annular die. Although it is probably the most efficient configuration, the referred to channels need not be cylindrical in shape but can be a converging nozzle or other configuration. It is only important that these channel pairs cause fluid flowing therethrough to diverge preferably to a maximum extent, upon emergence from each aperture pair.

Means are provided for forcing air or some other appropriate fluid through the channels and out the apertures generally toward the extruded thermoplastic tubing. Outward passage means are also provided between the aforementioned pairs of aperture rows for the air or other fluid to escape. Thus a circulatory system is provided forcing fluid from the outside toward the extruded tube, passing the fluid along the extruded tube and then passing the fluid back to the outside. Where the fluid is air, the atmosphere can be a suitable reservoir to pump from and to. If other fluid is used, a suitable reservoir and closed system can be provided or the outward passage can simply vent the fluid to the atmosphere.

This fluid suitably cools the extruded tubing and solidifies it to a sufficient extend to render it non-tacky and dimensionally stable. Given just this function, the tube of extruded thermoplastic material would freely expand according to the pressure applied by the internal fluid as a function of the cooling rate applied and inherent liquid strength of the thermoplastic material in use. The apparatus and process of the instant invention goes further than simply controlling cooling rate and thereby attempting to control rate and type of expansion of the extruded tubing. The particular configuration of the apertures referred to above causes the fluid flowing out of them into a jet pump effect with respect to the space between cooperating aperture pairs whereby forming a significant vacuum and thus drawing the extruded thermoplastic tubing toward the configuration imposition means and causing the extruded tubing to conform closely to the shape of this configuration imposition means where the two are juxtaposed. If the temperature and flow rate of the external fluid are adjusted in consideration of the particular thermoplastic being extruded and in consideration of the dimensions of the extruded tube as well as the annular extrusion die, the frost line of the extruded tubing can be positioned within the configuration imposition means, generally toward the downstream end thereof.

It should be clear that many of the processing variables are interdependent and are not independently definable. One purpose of this invention is to impose a particular rate and shape of expansion upon an extruded tube of thermoplastic material while cooling the extruded molten tube to a dimensionally stable and non-tacky condition. It has been found that the shape imposed during such expansion and cooling generally is diverging and has a maximum total included divergence angle of less than about 60° preferably less than about 50°.

In another aspect of the present invention it has been found to be preferred to form the individual pairs of aperture rows in a detachable ring means which is mounted on the inner periphery of the air carrying plenum channels adjacent the advancing tubing. The detachable mounting of the ring facilitates ring removal for ease of cleaning the apertures which may become clogged with foreign materials during extrusion operations. Additionally, since most of the intricate machining of the individual air rings is done on this portion of the ring, the cost is minimized by minimizing the size of the piece being machined.

The thermoplastic material extruded into a tube according to this invention may be a polyolefin such as polyethylene, polypropylene, polybutene-1, copolymers of two or more of these with or without other olefins, polyvinyl or vinylidene chloride, vinyl or vinylide chloride copolymers with acrylates, acrylonitrile, olefins and the like, acrylic homo and/or copolymers, styrene homo and/or copolymers, and in general, such other polymeric materials are conventionally melt extruded into film form.

The thermoplastic is usually through an annular die having a diameter of about 0.5 to 50 inches and a die gap of about 0.010 to 0.100 inch. Conventional air ring cooling processes may operate with a given combination of die orifice, blow-up ratio (ratio of bubble diameter to die diameter), extruder output and haul-off speed in order to produce a film of a given thickness. In accordance with the present invention, it has been found that converting such conventional conditions directly to the herein described imposed-shape process will usually result in inoperability. It has been found that, using conventional conditions, the molten extrudate will become slack as it leaves the die, allowing it to fold over on itself or flow outward between the vertically spaced cooling ring elements, so that it hangs up, sticks, or in some way becomes caught on the surfaces of the cooling ring elements immediately adjacent the annular die. It has been found that such inoperability can be substantially reduced or eliminated by increasing die orifice gap to form a gap which is wider than would normally be employed in conventional tubular extrusion operations. By using this larger orifice, it has been found possible to utilize the present process. In a conventional cooling process, the usual gap may be in the range of 0.025 to 0.040 inches, for example, whereas the required orifice gap in accord with the process of the present invention is 0.040 to 0.050 inches. For example, a 26 inch lay-flat tubular width (52 inch circumference) film, 0.00285 inches thick, is normally made with a 0.040 inch gap on a conventional prior art process, but requires a 0.050 inch gap with the present process. By using a larger die orifice gap, the molten film is thicker leaving the die, and must be drawn down with greater force to achieve desired final film thickness at the frost line. This greater force overcomes the tendency of the molten bubble to fold over on itself or flow outward between the cooling ring elements as aforedescribed. Although the exact mechanism is not understood it is theorized that the enlargement of the orifice gap and proportionate increase in the draw down force eliminates the problem of tube hang-ups, since as a result of increasing the draw down force a downward drag exerted by the cooling ring elements on the molten film tube is overcome. For purposes of the present invention it has been found that a ratio of die orifice gap to final film thickness should be above about 10:1 and preferably above about 15:1.

Extrusion rates are of course dependent upon the extruder used, however, flow rates of about 2 to 25, preferably 4 to 20, pounds per hour per inch of final bubble circumference can be easily maintained with the parameters of the practice of this invention. Blow up ratios, that is, the ratio of final film diameter to die diameter, on the order of about 1.0 to 5 are suitable as are final film thickness of about 0.4 to 10 mils. The preferred internal pressurizing fluid and external cooling fluids are air, however, other similarly acting relatively inert gases can be used. The internal fluid should be maintained at about or slightly above atmospheric pressure. The external fluid should be maintained at a temperature of about 0° to 200° F and be fed at a rate of about 75 to 600 SCFM per square foot of surface area of the molten tubing being cooled. It is within the scope of this invention to provide means within the island portion of the extrusion die means to extract some or all of the air injected into extruded tube so as to form a flowing system of air.

As shown in FIG. 1, there are provided a plurality of individual, hollow, cooling ring elements 34 which have centrally located circular openings of varying diameter to allow for passage therethrough of upwardly advancing thermoplastic tube 26. Each cooling element 34 has circular openings 38 located around the edge of element 34. The circular openings are superposed when the ring elements are in stacked alignment thereby forming a common channel for the passage of fluid therethrough. As shown in FIG. 1 a pump 36 feeds a fluid, suitably air, into the common channels formed by superposed circular openings 38. This fluid enters chamber 32 of hollow cooling ring 34 through aperature slots 49 located around the periphery of opening 38. This fluid is then impinged upon the extruded tubing 16 and 26 respectively through the diverging channels 42a and 42b via apertures 43. Apertures 43 are machined into detachable ring insert elements 40 which are detachably secured to the periphery of the centrally located circular openings of the hollow, plate-like, cooling ring members 34. A plurality of screw-like members 47 secure the insert elements 40 to cooling ring 34 as more clearly shown in FIG. 5. The fluid impinging on tubing 16–26 creates a decreased pressure between the aperture rows in the area designated 44. The fluid is allowed to pass out of the system through passages 46 between adjacent cooling ring members 34. Passages 46 are formed by the separation between adjacent ring members 34. This separation is provided by the circular raised boss members 48 surrounding the upper and lower peripheries of openings 38. When a plurality of cooling members 34 are arranged in superposed relation with their respective circular openings 38 in vertical alignment, the circular boss members 48 maintain separation between adjacent cooling ring members 34 and thereby provide passages 46 for fluid escape from the system after it has impinged against the surface of tube 16–26.

In accordance with a specific embodiment of the present invention the configuration imposing means is composed of a series of stacked, vertically spaced apart cooling rings of similar cumulative height. The rings are characterized by having a common air inlet chamber which is formed when the rings are superposed one upon the other. The two rows in each pair should be spaced about one-sixteenth to three-fourths inch apart with the row pairs spaced about ½ to 4 inches apart. The apertures themselves and the channels related thereto should preferably be in radial planes respectively and should be spaced apart about 2 to 6 aperture diameters apart in each row and the channel pairs should diverge about 50° to 160°, preferably 100° to 150°. The air return means between aperture row pairs should be about one-eighth to one-half inches wide so as to permit ready flow of the air back from the extruded tubing. It should be noted that the velocity and/or temperature of the external air can be substantially constant, at all aperture positions or it may be profiled in either or both regards processing conditions dictate.

Referring now to the drawings, and in particular FIG. 1, suitable thermoplastic resin 10 is fed to an extruder 12 in which it is plastified and then extruded through an annular die 22 into a tube 16 of molten thermoplastic material. Means 14 and 18, in the island 20 of the annular die, 22 are provided for feeding a fluid, suitably air, into the thermoplastic tube 16. The introduction of fluid into the bubble is as necessary to maintain a controlled pressure within the bubble. As the tube proceeds downstream it cools until, at a frost line 24, it solidifies into a dimensionally stable tubular structure 26. This solid tube 26 is collapsed by a guide 28 and then passes through the nip of a pair of take off rollers 30 from whence it is taken to other processing (not shown) or wound into a roll.

The high velocity fluid traveling parallel to the film, in the area designated Y in FIG. 5, also causes a slight decrease in pressure in addition to the pressure drop as aforedescribed in area 44. These pressure drops draw the still molten extruded tube 16 towards the rings 34 but the ejecting fluid forms a cushion between the rings and the tubing so as to prevent the tubing from contacting the rings and getting hung up on them while still in the molten condition.

Recesses 51 are provided in the sides of ring members 34 to accomodate elongated rods (not shown) which, when fastened to a group of rings 34, hold the stack of rings together as a unit. This facilitates removal of the upper group of rings (about the top half) in a single operation when it is desired to change the width of the extruded tubing. Usually the lower group of rings, which may be similarly fastened together, may remain in place adjacent the die during such a width changeover while the upper ring group is replaced by a stack of ring members having either larger or smaller centrally located openings dependent upon the desired circumference of the extruded tubing.

Ring members 34, as shown in FIG. 3, may be provided with integral internal rib members 50 to provide for overall stiffness of the individual ring structures.

From the foregoing it will be apparent to those skilled in the art that this invention is capable of relatively wide modification without departure from its essential spirit, wherefor, it is intended to be limited only by the scope of the following claims.

What is claimed is:

1. In an apparatus for forming tubular thermoplastic film comprising extruder means; annular extrusion die means, adapted in combination to extrude a seamless tube of thermoplastic film; pinch rollers spaced downstream from said annular extrusion die adapted to flatten said tube; and means for introducing a fluid under pressure into said tube to biaxially expand said tube and reduce the wall thickness thereof; the improvement which comprises a configuration imposition assembly disposed concentric to said extruded tube downstream of and adjacent to said annular die, which assembly comprises a series of spaced pairs of diverging aperture row means directed toward said extruded tubing, means for forcing a fluid through said apertures toward said extruded tubing thereby creating a suction and thus drawing said extruded tubing toward said assembly, said configuration imposition assembly further comprising a plurality of vertically spaced-apart individual plenum chambers, said aperture row means being further characterized by being detachably connected to said individual plenum chambers, and a common chamber formed by superposed individual plenum chambers for feeding said fluid under pressure into said individual plenum chambers.

2. An apparatus in accordance with claim 1 wherein said common chamber comprises a plurality of superposed openings said openings having raised bosses surrounding their upper and lower peripheries.

* * * * *